Nov. 2, 1954 C. W. RANSON 2,693,241
LOW DRAG ROTOR BLADE FOR HELICOPTERS
Filed Jan. 16, 1946 3 Sheets-Sheet 1
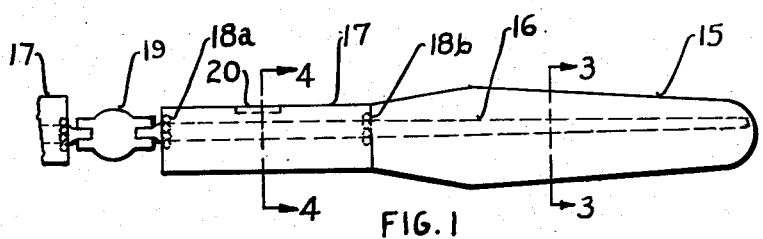
FIG. 1
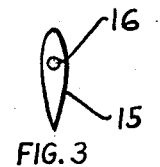
FIG. 3
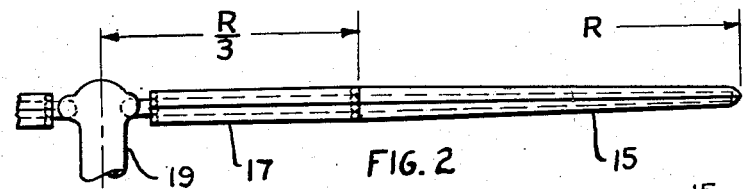
FIG. 2
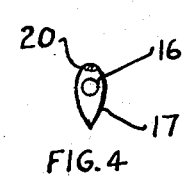
FIG. 4
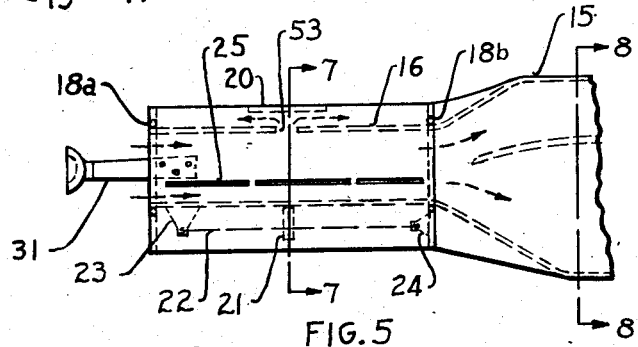
FIG. 5
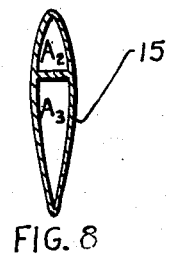
FIG. 8
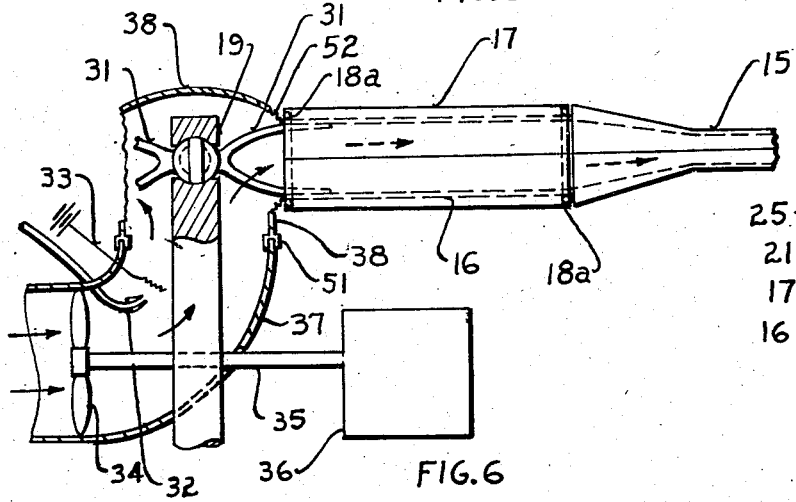
FIG. 6
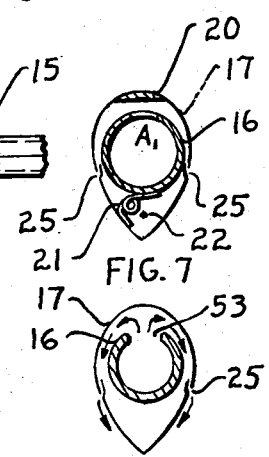
FIG. 7
FIG. 9
INVENTOR.
Charles W. Ranson Nov. 2, 1954  C. W. RANSON  2,693,241
LOW DRAG ROTOR BLADE FOR HELICOPTERS
Filed Jan. 16, 1946  3 Sheets-Sheet 2

INVENTOR.
Charles W. Ranson

Nov. 2, 1954   C. W. RANSON   2,693,241
LOW DRAG ROTOR BLADE FOR HELICOPTERS
Filed Jan. 16, 1946   3 Sheets-Sheet 3

INVENTOR.
Charles W. Ranson

United States Patent Office 2,693,241
Patented Nov. 2, 1954

2,693,241

LOW DRAG ROTOR BLADE FOR HELICOPTERS

Charles W. Ranson, Los Angeles, Calif.

Application January 16, 1946, Serial No. 641,471

6 Claims. (Cl. 170—159)

This invention relates to blades for rotors or propellers operating in a fluid medium and is more particularly concerned with rotor blades for helicopters, said blades subject to transverse air velocities or substantial components thereof in the plane of the rotor disk; and the objects of the invention are, first, to provide means for decreasing the aerodynamic drag of the blade in the plane of rotation, second, to provide means for decreasing the aerodynamic drag of the rotor in the line of flight, third, to provide means for effectively improving the aerodynamic efficiency of the lifting portion of the blade, fourth, to provide means for improving the autorotative characteristics of the blade, fifth, to provide means for increasing the strength-weight ratio of the blade structure while concurrently decreasing the aerodynamic drag thereof, sixth, to provide means for increasing the bending rigidity and torsional rigidity of the blade while concurrently decreasing the aerodynamic drag thereof, seventh, in a jet propelled blade or other blades requiring internal fluid flow, to provide a spanwise duct within the blade of sufficient cross sectional proportions as to allow the spanwise flow internally of large masses of fluid without imposing an increase in external aerodynamic drag, eighth, to provide means for adjusting the angle of incidence of the inboard portion of the blade independently of the blade proper and thus achieve improved flight performance in various flight maneuvers, and ninth, to provide means for rotating spanwise-segments of the blade airfoil with respect to the longitudinal strength member of the blade to effect desired blade twist and achieve optimum performance in various flight maneuvers. Further objects and advantages of the invention will appear as the specification proceeds.

Figure 13:
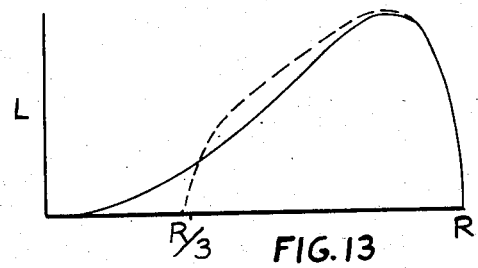
Figure 14:
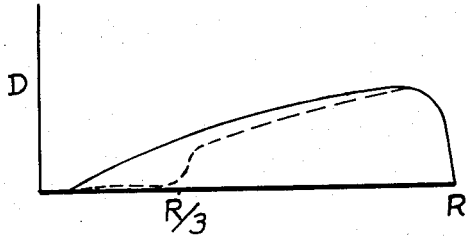
Figure 11:
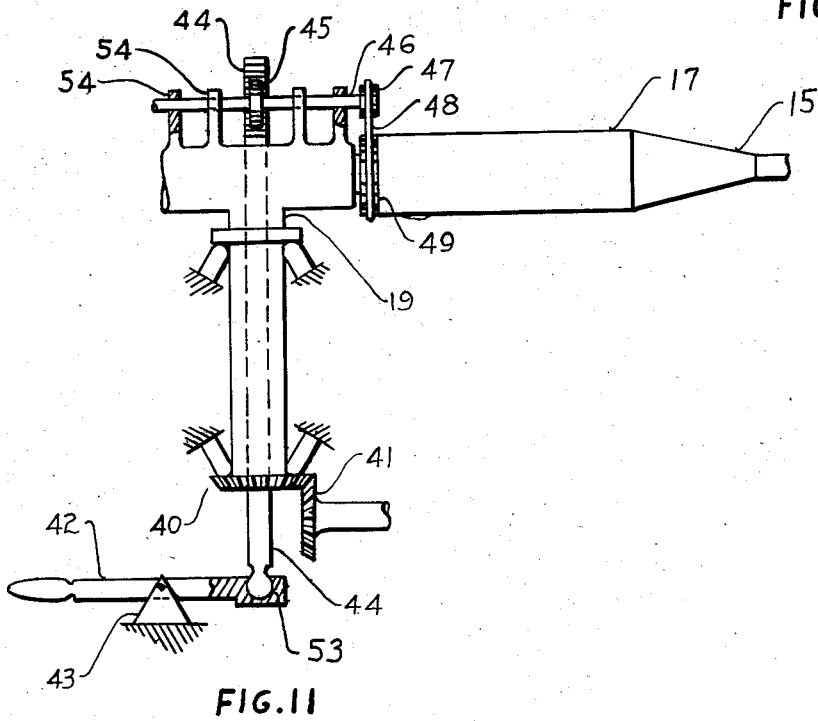
Figure 10:
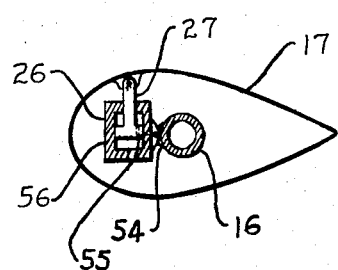
Figure 12:
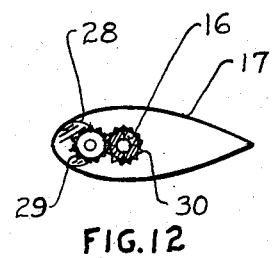
Figure 15:
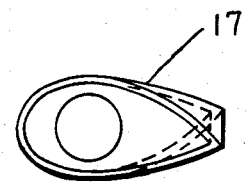
Figure 16:
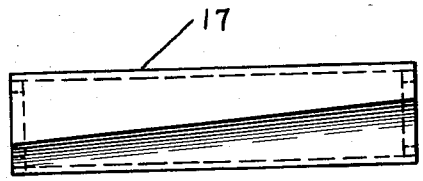
Figure 17:
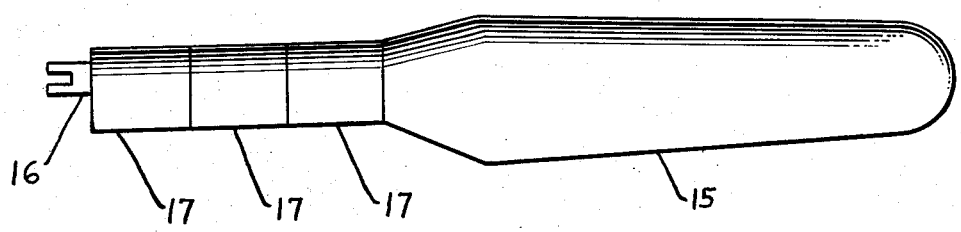
Figure 18:

One form of the invention is shown in the accompanying drawing, in which Fig. 1 is a plan view of the rotor blade and longitudinal fairing; Fig. 2, a side view of the rotor blade and longitudinal fairing; Fig. 3, a section of the blade at line 3—3 of Fig. 1; Fig. 4, a section of the longitudinal fairing at line 4—4 of Fig. 1; Fig. 5, a fragmentary plan view of the inboard portion of a modified form of the rotor blade; Fig. 6, a fragmentary side view of the inboard portion of the rotor blade shown in Fig. 5, and including a fragmentary side view of the rotor mast and fluid duct; Fig. 7, a section of longitudinal fairing at line 7—7 of Fig. 5; Fig. 8, a section of the blade at line 8—8 of Fig. 5; Fig. 9, a cross sectional view of the longitudinal fairing, with parts deleted, at line 7—7 of Fig. 5, illustrating route of fluid flow; Fig. 10, a cross sectional view of the longitudinal fairing and a damping device; Fig. 11, a fragmentary view of the rotor mast and longitudinal fairing; Fig. 12, a cross sectional view of a longitudinal fairing with a modified pitch control device; Fig. 13, a graphical plot of lift versus blade radius for a rotor blade; and Fig. 14, a graphical plot of drag versus blade radius; Figs. 15 and 16, end and aft views of a twisted fairing; and Figs. 17 and 18, plan and aft views respectively of a blade having a plurality of longitudinal fairings.

In rotating wing aircraft, present rotor blade designs exhibit poor aerodynamic characteristics, particularly inboard of the thirty percent radius point. In forward speed, the resultant wind across any increment of span is the vector sum of the rotational velocity of the blade, the forward speed of the craft, and the induced axial flow through the rotor disk. Hence, along the blade radius there are large variances in the resultant angle of attack and also large variances in the magnitude of the resultant air velocity. With present designs considerable blade twist, planform taper, thickness ratio taper, and cross sectional contour variation is required to obtain optimum aerodynamic efficiency and optimum lift distribution, throughout the blade radius. And the portion of the blade most difficult to design efficiently is that portion inboard of the approximate thirty percent radius point. This portion of the blade operates at a comparatively low rotational velocity and generally contributes only a small portion of the total lift of the blade. This is illustrated by the solid line of Fig. 13, which is a plot of lift versus blade radius for a typical rotor blade. Concurrently, the inboard thirty percent of the blade span contributes a generous proportion of the blade drag as shown by the solid line of Fig. 14, which is a plot of drag versus blade radius for a rotor blade. In general, the inboard thirty percent portion of the blade operates under unfavorable aerodynamic conditions of high drag and low lift, and in some flight maneuvers even operates in a stalled condition. Because of the widely different design requirements for this portion of the blade for difficult flight maneuvers, it is very difficult if not impossible to obtain a satisfactory compromise design.

This invention presents a solution to the problem of efficient blade design by providing means for considerably reducing the drag of the inboard approximate thirty percent portion of the blade regardless of the flight maneuver. Referring to Fig. 1, rotor blade or lifting portion 15 is attached to rotor mast or hub member 19 by a longitudinal strength member 16. The inboard portion of the longitudinal strength member 16 is covered by a longitudinal fairing 17. The longitudinal fairing 17 is rotatably mounted to member 16 by bearings 18a and 18b. The surface of fairing 17 may be of any airfoil contour, but the preferred contour is of symmetrical airfoil section with a fineness ratio of about four as this section has low drag characteristics. It is to be understood that throughout this specification and the appended claims the term fairing is defined as a member or structure, the primary function of which is to produce a smooth outline and to reduce drag and to obtain reaction upon its surfaces from the air through which it moves. The magnitude of the reaction will depend, of course, upon the angle of incidence of the fairing with respect to the resultant wind. Longitudinal fairing 17 is mass balanced both statically and dynamically about the longitudinal axis of rotation by weight 20. Because of mass balancing, fairing 17 is unaffected by flapping inertia forces and gravity forces. The effective forces acting on fairing 17 are aerodynamic forces. The aerodynamic center of pressure of longitudinal fairing 17 is aft of the longitudinal axis of rotation such that substantial restoring moments will always seek to rotate fairing 17 into the position of equilibrium, which is also the position of least drag. In other words, the fairing 17 will constantly hunt the wind, i. e. position of least drag. Fig. 2 is a side view of the rotor blade and shows longitudinal fairing 17 extending outboard to the approximate thirty percent radius point. Because the resultant wind over this portion of the span will strike fairing 17 at a variance of angles at different spanwise distances, fairing 17 may be subdivided into two or more independent segments. See Figs. 17 and 18. Thus each segment constitutes a separate longitudinal fairing, each a complete unit in itself and free to establish its own position of equilibrium. This problem may also be met by incorporating a twist in fairing 17. See Figs. 15 and 16. The twist is such as to align the chord line at any given blade radius with the direction of the resultant wind at that radius. The direction of the resultant wind at the various radii should, of course, be calculated to correspond with conditions at cruising speed or with conditions in any flight maneuver at which it is desired to excell in performance.

An important feature of this invention is that the refinement of low blade drag is carried in practical design to the point where for settings of nominal pitch no change in pitch is required when changing from power-on flight to power-off autorotative descent. The effect of decreasing the blade drag is to increase the forward component of the resultant aerodynamic force on the blade. It is this forward component of force that constitutes the towing or autorotative force on the blade. Even in existing blade designs, the autorotative pitch range is increased substantially by decreasing the overall blade drag by incorporating fairing 17. A further important aerodynamic advantage derived through fairing 17 is that of reducing the amount of design compromise or transition required in overall blade design from the root to the tip, thus facilitating the design for optimum aerodynamic efficiency throughout the region outboard of the thirty percent span.

Referring to Fig. 3 which is section 3—3 through Fig. 1 and to Fig. 4 which is section 4—4 through Fig. 1 it may be seen that longitudinal strength member 16 is tapered and proportioned within the limits of the contour of blade 15 and the contour of longitudinal fairing 17. For a symmetrical airfoil, the drag coefficient increases slowly with increasing thickness ratio and consequently longitudinal fairing 17 may be increased to any reasonable thickness without materially increasing the drag. As a result, the inboard thirty percent of the longitudinal strength member is designed for optimum strength-weight ratio. The strength member is of large cross sectional proportions thus providing for efficient distribution of material in bending and torsion. Bending strength is of particular importance in rigid rotor blades where large bending moments must be accommodated, and torsional rigidity is important in any rotor blade in that it affords a measure of control over the angle of incidence of the blade. Equally important, the efficient distribution of material in the longitudinal strength member reduces the magnitude of cyclic stresses and thus reduces fatigue in the material and increases the working life of the blade. By using longitudinal fairing 17 these advantages are gained without increase in aerodynamic drag.

Longitudinal fairing 17 effects a saving in the overall weight of the blade by virtue of the fact that said fairing encompasses a smaller planform area than the portion of conventional blade replaced, and that said fairing is less highly stressed and consequently is adaptable to wider rib spacing and lighter materials. The actual structure of longitudinal fairing 17 may consist of sheet metal ribs and skin, or of plastic, or of other material, and may be of either built-up or solid construction or a combination thereof. This particular detail may vary in accordance with practices in aircraft construction. Bearings 18a and 18b provide for near frictionless rotation of longitudinal fairing 17 about the center line of strength member 16 or any longitudinal axis. Bearing 18b is confined in a spanwise direction on strength member 16 and functions as a thrust bearing to transmit the centrifugal force of fairing 17 into the blade structure, and bearing 18a is mounted on strength member 16 without confinement in the spanwise direction, thus functioning as a slip joint to allow for expansion due to centrifugal force or temperature of strength member 16 with respect to fairing 17. Bearings 18a and 18b are self-aligning to permit bending of longitudinal strength member 16 with respect to longitudinal fairing 17 without causing binding of said fairing on said strength member.

Fig. 5 and Fig. 6 show respectively the fragmentary plan and side view of the inboard portion of a rotor blade adapted to jet propulsion or to means of boundary layer control. The interior of the blade functions as a duct for the spanwise flow of fluid masses. Fig. 6 shows the additional detail of power plant 36, which through shaft 35 drives compressor 34 and forces fluid masses through duct 37 to the rotor head and out the interior of the blade. The fluid masses are heated by compression and may be further heated by the combustion of fuel which is sprayed into the fluid flow from a nozzle on the end of fuel line 32 and ignited by electric hot wire 33. The fluid flow is heated for the purposes of increasing the propulsive thrust of the jet-driven blades and to prevent the formation of ice over the surface of the blades. As shown in Fig. 6, rotor blade 15 is mounted to rotor mast 19 by fork fitting 31 and the entire assembly rotates with respect to the fuselage. Rotor head duct 38 rotates with the rotor mast and blades, and a fluid-tight slip-joint is provided at flanges 51. Diaphragm 52 prevents fluid leakage at the junction of the blade 15 and duct 38. Fitting 31 attaches to rotor mast 19 by a ball and socket joint to allow universal motion of blade 15 with respect to rotor mast 19.

As shown in Figs. 5 and 6 blade 15 tapers from airfoil section into the circular section of strength member 16. This change in section is also shown in Figs. 7 and 8 which respectively show sections along line 7—7 and line 8—8 of Fig. 5. The internal area $A_1$ of longitudinal member 16 is equivalent to the sum of internal areas $A_2$ and $A_3$ of blade 15. Thus there is practically no expansion or contraction of the fluid flow in passing from strength member 16 to blade 15. This continuity of flow reduces internal turbulence in the fluid mass, and consequently the amount of kinetic energy dissipated as heat energy of friction is minimized. The result is an increased conservation of energy and an increased efficiency in jet propulsion or boundary layer control as the case may be. The large cross sectional area of strength member 16 is aerodynamically permissible because of longitudinal fairing 17, which is rotatably mounted on member 16 by bearings 18a, and consequently may revolve into the direction of the resultant wind and assume the position of least aerodynamic drag as previously described. Thus large fluid masses may be internally accommodated by the blade without material increase of external aerodynamic drag.

In rotating wing aircraft, the velocity of forward flight alternately adds to and subtracts from the rotational velocity of the individual revolving blades. Thus the resultant velocity vectors along the blade are subject to considerable change in both magnitude and direction. Since longitudinal fairing 17 is designed to continuously seek the direction of the resultant wind, said fairing will therefore oscillate about its longitudinal axis of rotation at a magnitude that is a function of the velocity of the crosswind and at a frequency equal to the rotational frequency of the rotor. However, since the direction of the resultant wind is also the direction of the major axis of said fairing corresponding to minimum aerodynamic drag, it is important that fairing 17 be free to swing into line with the resultant wind with a minimum of restraining force and time lag. That is, longitudinal fairing 17 should rotate promptly with a minimum of frictional and inertia restraint in order to effectively follow the resultant wind and obtain full advantage of minimum drag.

The friction forces in thrust bearing 18b as shown in Fig. 1 reach considerable magnitude under rotor rotational conditions because of the large centrifugal force of fairing 17 at high values of rotor speed. To reduce this retarding friction force a cable or elongated tension element 22 is substituted for thrust bearing 18b for transmitting the centrifugal force of fairing 17. This is shown in Fig. 5. Fairing 17 is supported rotationally on strength member 16 by self aligning bearings 18a and 18b and fairing 17 is restrained in a spanwise direction by cable 22. Cable 22 is as long as permissible in order to reduce to negligible magnitudes the spanwise motion of fairing 17 as said fairing oscillates about its longitudinal axis. Cable 22 is attached to fairing 17 by bracket 24 and to strength member 16 by bracket 23.

As fairing 17 oscillates about its longitudinal axis of rotation, said fairing is subject to the inertia forces of angular accelerations and decelerations of the mass of said fairing. Consequently, the fairing assembly is made of light weight material and is of compact proportions in order to minimize the moment of inertia and forces of angular acceleration. With these forces reduced to a minimum, they still may be of sufficient magnitude as to prevent fairing 17 from promptly revolving into the resultant wind. To compensate for these inertia forces and to prevent time lag, spring 21 is utilized to help restore fairing 17 to its neutral position after displacement by aerodynamic forces. As shown in Figs. 5 and 7 coil spring 21 is attached to fairing 17 and strength member 16 in such a way that said spring tends to center fairing 17 in the neutral position of the most common flight maneuver, as for instance, the maneuver of flying forward at cruising speed. Then as aerodynamic forces cause fairing 17 to oscillate about the neutral position, the restoring force in spring 21 will increase in proportion to the amplitude of displacement of fairing 17. This is in harmony with the fact that the greater the amplitude of displacement the greater the inertia forces and consequently the greater the restoring force required in the spring to cancel the effect of the inertia forces. For example, as said fairing approaches its position of maximum displacement in a given cycle, said fairing should be in a decelerating condition, however, fairing would normally due to inertia forces the said fairing would continue on its way until aerodynamic forces became excessive and overpowering. This constitutes a time lag during which drag forces became excessive. Spring 21 eliminates such a condition by acting as a brake and supplying the force necessary to compensate for inertia under conditions approaching maximum displacement from neutral position. Similarly as the fairing 17 stops and then begins to rotate back toward neutral, the inertia of said fairing must be overcome in creating a return acceleration. Spring 21 does this by supplying energy to the system. Thus spring 21 functions to compensate for the rotational inertia forces of fairing 17, and consequently, fairing 17 is affected only by aerodynamic forces. Mass balance 20 serves to align gravity and linear inertia forces of said fairing assembly through the axis of rotation in such a way that said forces cannot act to change the position of fairing 17.

Another feature shown in Fig. 5 is an application of a method of boundary layer control. The principle of boundary layer control is well known and it will suffice here to summarize the theory briefly. Turbulent air flowing over a surface creates considerably more drag on that surface than would laminar flow. And the reason that the layer of air adjacent to the surface becomes turbulent normally is because the air slows down in its travel because of friction with the surface. The retarded layer of air constitutes an unstable flow that tends to become turbulent. The problem in boundary layer control is to reenergize the slow moving layer of fluid next to the surface by increasing its velocity. Thus the boundary layer retains its stability and remains laminar. As shown in Fig. 6 compressed fluid is forced through the hollow blade, and as shown in Figs. 5 and 9 a portion of the compresesd fluid passes through slot 53 in the wall of longitudinal strength member 16. This compressed fluid passes into the interior of longitudinal fairing 17. Fairing 17 is sealed at the ends and is otherwise fluid-tight except for longitudinal slots 25 extending along the top and bottom of fairing 17 as shown in Figs. 5 and 7. The compressed fluid circulates through the interior of fairing 17 and passes out slots 25. Since the compressed fluid has been heated by compression and by the combustion of fuel said fluid serves as a vehicle for heat and prevents the formation of ice on fairing 17. The fluid is ejected under pressure through slots 25 which guide the fluid rearward tangentially over the surface of fairing 17. The velocity and kinetic energy of the ejected fluid is sufficient to accelerate the adjacent layer of air flowing over the surface. Thus the boundary layer is reenergized and laminar flow characteristics are retained. The resulting low aerodynamic drag represents a definite refinement in the overall blade design.

When the elastic period of vibration of fairing 17 and the elastic period of vibration of blade 25 coincide and when an exciting force is supplied by the engine, as the impulses of the explosions in the cylinders, an unstable oscillation of large amplitude may be rapidly built up in the blade assembly which may cause it to disintegrate. Therefore, to dampen these oscillations or vibrations of fairing 17, said fairing is linked to strength member 16 by hydraulic damper 26 as shown in Fig. 10. Damper 26 tends to prevent a build up of amplitude of the oscillations of said fairing.

In Fig. 10 is shown a sectional view of the longitudinal fairing 17 and strength member 16. The rotational motion of fairing 17 about strength member 16 is damped or restricted by damper 26. Cylinder 56 is pinned to bracket 54 to allow freedom of said cylinder in a chordwise plane, and said bracket is attached to member 16. Similarly piston 27 is pinned to fairing 17 to allow freedom of said piston in a chordwise plane. Piston 27 slides inside of cylinder 26 and works against the force of oil pressure within the cylinder as the oil flows through orifice 55 in piston 27. Another function of damper 26 is to prevent or minimize aerodynamic buffeting of fairing 17 as said fairing floats in the resultant wind. Buffeting is a form of vibration in said fairing caused by recurring aerodynamic impact. This impact is encountered when inertia or other forces cause said fairing to deviate substantially from alignment with the resultant wind. The function of damper 26 is to create a retarding force on fairing 17, and thus though lag is introduced, said fairing will smoothly follow the resultant wind without overcontrol and buffeting. The damping action of damper 26 is supplemented by the damping action of the friction in bearing 18a.

To obtain minimum drag of blade 15, fairing 17 is mouted in such a manner as to freely float in the resultant wind as explained. However, if the criterion of design is maximum thrust as in hovering or in cargo transport, or in maximum speed, fairing 17 may be fixedly mounted with provision for adjustment of the angle of incidence of said fairing. Thus fairing 17 in substance becomes a working airfoil with independent pitch control, and the pitch of said fairing may be adjusted by the pilot to obtain optimum performance in various flight maneuvers. This feature is illustrated in Figs. 11 and 12. Fig. 11 is a fragmentary side view of rotor mast 19 and blade 15. Rotor mast 19 is driven by the power plant through bevel gears 40 and 41, and the entire blade and rotor assembly revolves. Fairing 17 is mounted on strength member 16 by bearings and is rotatable thereon. At the inboard end of fairing 17 is attached sprocket 49 and said sprocket is linked to sprocket 47 by continuous chain 48. Thus rotation of sprocket 47 establishes the angle of incidence of fairing 17. Rotation of sprocket 47 is controlled by rack 44 and pinion 45. Rack 44 extends through hollow rotor mast 19 and revolves therewith. Rack 44 is supported and controlled vertically by lever 42 which pivots on support 43 and is attached to said rack by ball and socket joint 53. Pinion 45 drives sprocket 47 through torsion shaft 46 and the entire torsion shaft assembly is held by supports 54. Thus by operating lever 42 the pilot may adjust fairing 17 at any desired angle of incidence. The cross sectional contour of fairing 17 may, of course, be of any airfoil shape or form without departing from the scope of the invention. Further, the mechanical pitch control system shown in Fig. 11 may be readily substituted for by hydraulic or electrical mechanisms as is standard practice by those skilled in the art. Such alterations are simply substitutions and are within the scope of the invention. Fig. 12 shows a method for obtaining pitch control of fairing 17 by electrical means. Electric motor 28 in the nose of fairing 17 functions as a mass balance and is the reversible, quick-stopping type motor. Motor 28 drives gear 29 which engages gear 30, but gear 30 encircles and is fastened to strength member 16. The motor is wired to slip rings on the rotor mast and by brushes picks up the current from an electric control box not shown. Thus operation of reversible motor 28 forces rotation of fairing 17 about strength member 16 into any desired angle of incidence. Motor 28 has a magnetic brake which affords a means of locking fairing 17 in any given position. Fairing 17, of course, may be divided into a number of shorter fairings, each fairing subject to independent control of the nature described. And the entire blade or any portion may be so composed of a series of airfoil sections, each section rotatably mounted with provision for means of control of the angle of incidence. In effect, this constitutes a blade of variable twist. See Figs. 17 and 18.

The effect of properly controlled blade twist is to increase the lift and decrease the drag of the blade throughout the blade span for any given flight condition. Fairing 17 as shown in Fig. 1, however, functions automatically in all flight maneuvers. The aerodynamic effect of fairing 17 is illustrated by the dotted lines in Fig. 13 and Fig. 14. As shown in Fig. 13, the lift of the blade inboard of the one-third radius point is sacrificed, but the sacrificed portion is small compared to the lift of the entire blade. Further, this sacrificed portion of the lift may be recovered by means of optimum design of the blade over the outboard two thirds span. Optimum design is practical principally because less overall design compromise is required in the blade as a direct result of the use of fairing 17 as previously explained. Thus as shown by the dotted line in Fig. 13 the next effect on lift is negligible or at most small, and may result in either increased lift or decreased lift depending upon the amount of refinement of design. The effect of fairing 17 and optimum design on blade drag is shown by the dotted line in Fig. 14. The decrease in drag, particularly inboard of the one-third radius point, represents a considerable increase in aerodynamic efficiency.

While I have illustrated only the preferred form of my invention it is to be understood that I do not limit myself to this exact form but intend to claim my invention broadly as set forth in the appended claims.

I claim:
1. In an aircraft rotor, an assembly consisting of a hub member and an elongated blade comprising a lifting portion and a longitudinally extending strength member, means for connecting said blade to said hub, and a longitudinally extending fairing substantially enclosing a spanwise segment of the longitudinal strength member of the blade and means for mounting said fairing about said strength member in such a manner that said fairing may rotate about a longitudinal axis, and a cable-like element arranged to extend substantially longitudinally with respect to said blade and attaching at one end to said fairing and attaching at the other end to said hub and blade assembly in such a manner as to transmit the centrifuged force of said fairing to said hub and blade assembly.

2. In an aircraft rotor, an assembly consisting of a hub member and an elongated blade comprising a lifting portion and a longitudinally extending strength member, means for connecting said blade to said hub, and a longitudinally extending fairing substantially enclosing a spanwise segment of the longitudinal strength member of the blade and means for mounting said fairing about said strength member in such a manner that said fairing may rotate about a longitudinal axis, and flexibly acting elongated tension structure arranged to extend substantially longitudinally with respect to said blade and attaching at one location on said tension structure to said fairing and attaching at a second spaced location on said tension structure to said hub and blade assembly in such a manner as to transmit centrifugal force from said fairing to said hub and blade assembly.

3. In an aircraft rotor, an assembly consisting of a hub member and an elongated blade member and means for connecting said blade member to said hub member, and said blade member comprising a lifting portion extending from approximately the one-third blade radius to the blade outer tip end and a longitudinally extending strength member extending inwardly to said hub member, and a longitudinally extending fairing substantially enclosing said strength member over a portion of the approximate inboard one-third blade span, means for mounting said fairing about said strength member in such a manner that said fairing may rotate about a longitudinal axis, and an elongated tension element arranged to extend substantially longitudinally with respect to said blade and attaching at one location on said tension element to said fairing and attaching at a second spaced location on said tension element to said hub and blade assembly.

4. In an aircraft rotor, an assembly consisting of a hub member and an elongated blade comprising a lifting portion and a longitudinally extending strength member, means for connecting said blade to said hub, and a longitudinally extending fairing substantially enclosing a spanwise segment of the longitudinal strength member of the blade and means for mounting said fairing about said strength member in such a manner that said fairing may rotate about a longitudinal axis, and said fairing including structurally extraneous leading edge mass for balancing said rotatable fairing chordwise about said axis of rotation to provide for aerodynamic flotation of said fairing independently of gravity forces, and an elongated tension element arranged to extend substantially longitudinally with respect to said blade and attaching at one location on said tension element to said fairing and attaching at a second spaced location on said tension element to said hub and blade assembly in such a manner as to transmit centrifugal force from said fairing to said hub and blade assembly.

5. In an aircraft rotor blade, an elongated outer lifting portion of airfoil form and an elongated inner structural portion in continuous association with said outer portion, and a longitudinally extending fairing of airfoil section substantially enclosing a spanwise segment of said inner structural portion, and means for rotatably mounting said fairing about said structural portion, and an elongated tension element arranged to extend substantially longitudinally with respect to said blade and spaced means for connecting said elongated tension element to said blade and to said fairing to provide for longitudinal positioning of said fairing with respect to said blade.

6. In an aircraft rotor, an assembly consisting of a hub member and an elongated blade comprising a lifting portion and a longitudinally extending strength member, means for connecting said blade to said hub, and a longitudinally extending fairing substantially enclosing a spanwise segment of the longitudinal strength member of the blade, and means for mounting said fairing about said strength member in such a manner that said fairing may rotate about a longitudinal axis, and an elongated tension element flexibly arranged to extend substantially longitudinally with respect to said blade and attaching at one location on said tension element to said fairing and attaching at a second spaced location on said tension element to said hub and blade assembly, and a resilient structural element to elastically associate said fairing with said hub and blade assembly to provide a restoring moment on said fairing when said fairing is rotationally displaced about said longitudinal axis.

References Cited in the file of this patent

UNITED STATES PATENTS

| Number | Name | Date |
|---|---|---|
| 1,104,254 | Eddelbuttel-Reimers | July 21, 1914 |
| 1,302,947 | Martin | May 6, 1919 |
| 1,892,927 | Blaylock | Jan. 3, 1933 |
| 2,030,578 | Flettner | Feb. 11, 1936 |
| 2,041,796 | Stalker | May 26, 1936 |
| 2,048,326 | Dyer et al. | July 21, 1936 |
| 2,068,617 | Wilford et al. | Jan. 19, 1937 |
| 2,081,957 | Roche | June 1, 1937 |
| 2,111,975 | Larsen | Mar. 22, 1938 |
| 2,308,802 | Barling | Jan. 19, 1943 |
| 2,342,578 | Giannini | Feb. 22, 1944 |
| 2,399,828 | Roche | May 7, 1946 |
| 2,412,908 | Platt | Dec. 17, 1946 |
| 2,417,647 | Hasler | Mar. 18, 1947 |
| 2,483,913 | Lampton | Oct. 4, 1949 |

FOREIGN PATENTS

| Number | Country | Date |
|---|---|---|
| 126,437 | Great Britain | May 5, 1919 |
| 259,068 | Great Britain | Oct. 7, 1926 |
| 449,664 | Great Britain | July 1, 1936 |
| 851,766 | France | Oct. 9, 1939 |